(12) United States Patent  (10) Patent No.: US 8,783,619 B2
Hormiere et al.  (45) Date of Patent: Jul. 22, 2014

(54) AIR INLET OF AN AIRCRAFT NACELLE INCLUDING OPTIMIZED FROST TREATMENT

(75) Inventors: Arnaud Hormiere, Toulouse (FR); Alain Dega, Montberon (FR); Stephane Gaillot, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 64 days.

(21) Appl. No.: 13/515,880

(22) PCT Filed: Dec. 14, 2010

(86) PCT No.: PCT/FR2010/052702
§ 371 (c)(1),
(2), (4) Date: Jun. 14, 2012

(87) PCT Pub. No.: WO2011/073561
PCT Pub. Date: Jun. 23, 2011

(65) Prior Publication Data
US 2012/0248249 A1    Oct. 4, 2012

(30) Foreign Application Priority Data
Dec. 18, 2009  (FR) ...................................... 09 59183

(51) Int. Cl.
B64D 15/02  (2006.01)
(52) U.S. Cl.
USPC ................ 244/134 B; 244/134 R; 60/39.093
(58) Field of Classification Search
USPC .................. 244/134 B, 134 A, 53 B
See application file for complete search history.

(56) References Cited

U.S. PATENT DOCUMENTS

| | | | | |
|---|---|---|---|---|
| 4,688,745 A | * | 8/1987 | Rosenthal | 244/134 R |
| 5,058,837 A | * | 10/1991 | Wheeler | 244/200.1 |
| 5,088,277 A | * | 2/1992 | Schulze | 60/39.093 |
| RE36,215 E | * | 6/1999 | Rosenthal | 244/134 B |
| 6,227,800 B1 | * | 5/2001 | Spring et al. | 415/116 |
| 6,267,328 B1 | * | 7/2001 | Vest | 244/134 B |
| 6,354,538 B1 | * | 3/2002 | Chilukuri | 244/134 B |
| 6,371,411 B1 | * | 4/2002 | Breer et al. | 244/134 R |
| 6,443,395 B1 | * | 9/2002 | Porte et al. | 244/134 R |
| 6,457,676 B1 | * | 10/2002 | Breer et al. | 244/134 R |

(Continued)

FOREIGN PATENT DOCUMENTS

EP  2204320 A2  7/2010
FR  2813581 A1  8/2002

OTHER PUBLICATIONS

International Search Report, dated Jun. 1, 2011, from corresponding PCT application No. PCT/FR2010/052702.

*Primary Examiner* — Christopher P Ellis
*Assistant Examiner* — Medhat Badawi
(74) *Attorney, Agent, or Firm* — Young & Thompson

(57) ABSTRACT

An air inlet of an aircraft nacelle includes a pipe, extending over the circumference of the air inlet and defined in the back by a front frame, and an element for the localized injection of hot air into the pipe, thus ensuring the flow of hot air into the pipe in one direction along the circumference of the nacelle. The inlet includes at least one vortex generator (38) in the pipe (22), the generator being plate-shaped or shaped in a manner projecting from the wall of the pipe (22), in order to disrupt the hot air flow so as to compensate the effect of the centrifugal force and reduce the temperature gradient between the inside and outside of the pipe (22).

18 Claims, 3 Drawing Sheets

(56) References Cited

U.S. PATENT DOCUMENTS

| | | | |
|---|---|---|---|
| 6,688,558 B2 * | 2/2004 | Olsen et al. | 244/134 R |
| 6,848,656 B2 * | 2/2005 | Linton | 244/134 C |
| 8,061,657 B2 * | 11/2011 | Rocklin et al. | 244/134 B |
| 8,434,724 B2 * | 5/2013 | Chelin et al. | 244/207 |
| 2002/0027180 A1 * | 3/2002 | Porte et al. | 244/134 R |
| 2002/0047070 A1 * | 4/2002 | Breer et al. | 244/134 R |
| 2002/0179773 A1 * | 12/2002 | Breer et al. | 244/134 R |
| 2004/0031878 A1 * | 2/2004 | Linton | 244/10 |
| 2008/0061559 A1 * | 3/2008 | Hirshberg | 290/55 |
| 2009/0108134 A1 * | 4/2009 | Thodiyil et al. | 244/134 B |
| 2010/0163677 A1 * | 7/2010 | Rocklin et al. | 244/134 B |
| 2010/0327120 A1 * | 12/2010 | Chelin et al. | 244/207 |

* cited by examiner

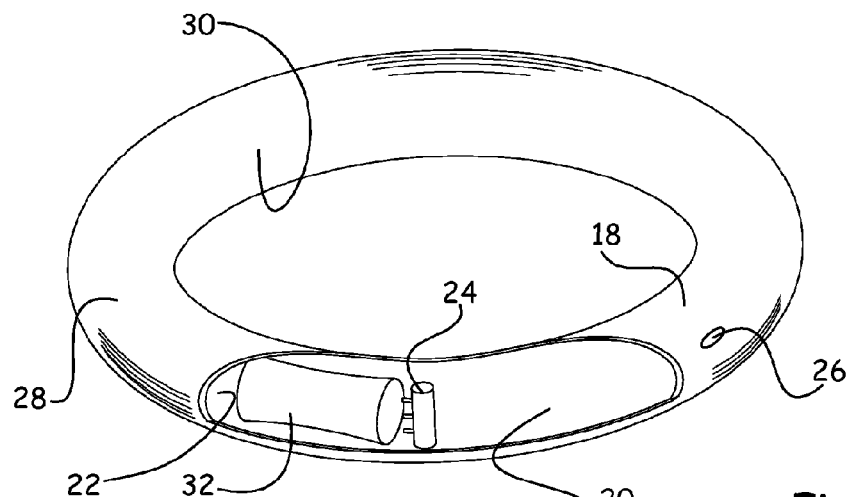
Fig.3
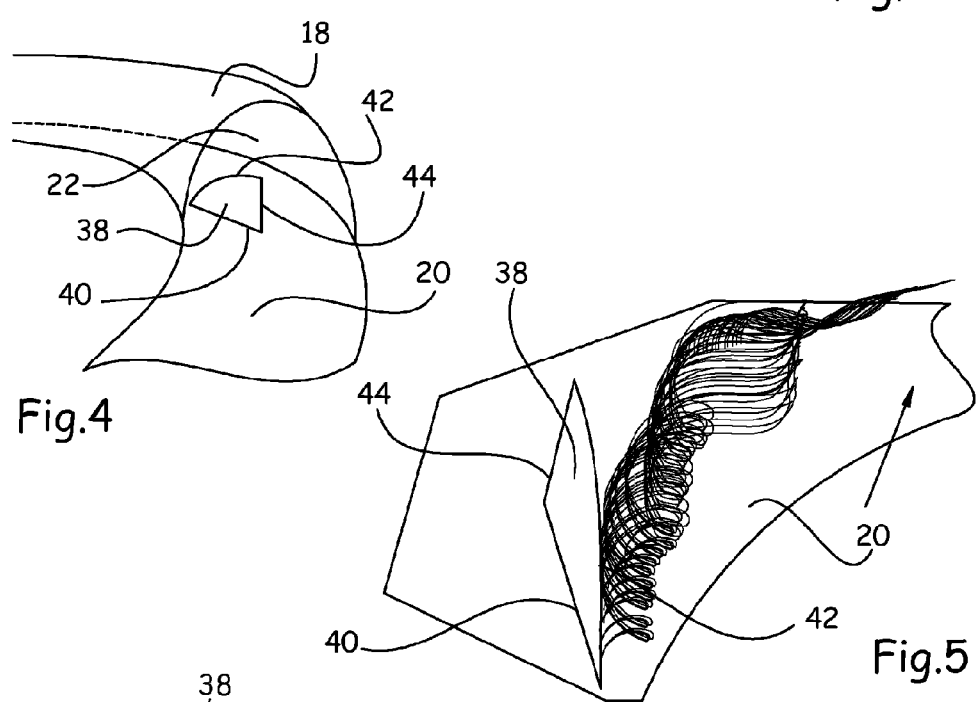
Fig.4
Fig.5
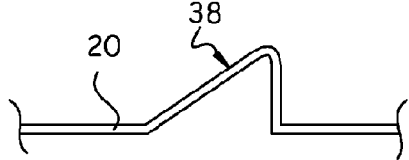
Fig.6
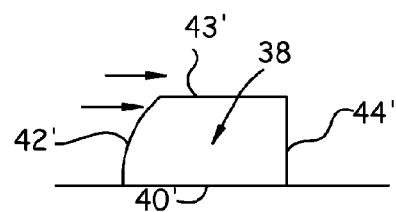
Fig.7

AIR INLET OF AN AIRCRAFT NACELLE INCLUDING OPTIMIZED FROST TREATMENT

This invention relates to an air intake of an aircraft nacelle that comprises an optimized frost treatment.

In a known manner, as illustrated in FIG. 1, a propulsion system 10 of an aircraft, for example connected under the wing by means of a mast 12, comprises a nacelle 14 in which a power plant is arranged in an essentially concentric manner. The longitudinal axis of the nacelle is referenced 16.

The nacelle 14 comprises an inside wall that borders a pipe with an air intake 18 at the front that makes it possible to channel the air in the direction of the power plant.

This invention relates more particularly to a nacelle that integrates a frost treatment process that uses hot air in contact with the inside wall of the air intake 18, in particular hot air that is drawn off from the engine.

According to an embodiment that is known from the documents FR-2,813,581 and U.S. Pat. No. 6,443,395, illustrated in FIGS. 2 and 3, a nacelle 14 comprises, on the inside, a partition that is called a front frame 20 that with the air intake 18 borders a pipe 22 that extends over the entire circumference of the nacelle and that has an essentially D-shaped cross-section.

This pipe 22 is supplied with hot air by a system of nozzles or a localized feed pipe 24, with the air that circulates in this pipe being discharged via an exhaust 26 that can be seen in FIG. 3.

The injected hot air makes a 360° passage around the pipe 22. In addition to a centrifugal action, the hot air circulates more on the outer side of the air intake referenced 28 in FIG. 2.

If the means 24 for injection of hot air are placed at the lowest point of the nacelle, the de-icing capacity is not homogeneous over the circumference. It quickly increases to reach a maximum value and then gradually decreases over the rest of the circumference, with an inconsistency of frost treatment at the lowest level.

Because of the centrifugal action and/or the non-homogeneous aspect of the temperature over the circumference, the temperature at the inner side 30 of the air intake cannot be adequate.

To remedy this possible inadequacy, it is possible to inject air that is hotter and/or with a higher flow rate.

However, this solution is not satisfactory because it is necessary to provide high-temperature-resistant materials for the front frame, the air intake and the optional acoustic treatment coverings. This aspect tends to reduce the selection of usable materials and generally imposes the use of heavy and relatively expensive materials.

To limit the impact of this injected hot air, the documents FR-2,813,581 and U.S. Pat. No. 6,443,395 propose placing, behind the injection means 24, a mixer 32 that mixes the injected hot air with the hot air that is already present and that circulates in the pipe 22. This solution has the advantage of reducing the maximum value of the temperature experienced by the wall of the pipe 22.

However, this mixer 32 does not make it possible to homogenize the temperature of the hot air over the entire circumference. Thus, the hot air always tends to flatten itself against the outer side 28 of the air intake because of the centrifugal force.

The purpose of this invention is to remedy the drawbacks of the prior art by proposing an air intake of an aircraft nacelle that comprises means for optimizing the frost treatment.

SUMMARY OF THE INVENTION

For this purpose, the invention has as its object an air intake of an aircraft nacelle that comprises a pipe that extends over the circumference of said air intake and that is bordered to the rear by a front frame, with means for localized injection of hot air in said pipe providing the circulation of hot air in the pipe along the circumference of the nacelle in one direction, characterized in that it comprises—in the pipe—at least one vortex generator in the shape of a plate or in a shape projecting from the wall of the pipe to disrupt the flow of hot air so as to compensate for the action of centrifugal force and to reduce the temperature gradient between the inner side and the outer side of said pipe.

BRIEF DESCRIPTION OF THE DRAWINGS

Other characteristics and advantages will emerge from the following description of the invention, a description that is provided only by way of example, relative to the accompanying drawings, in which:

FIG. 3 is a diagrammatic perspective view of a pipe of an air intake,

FIG. 4 is a diagrammatic perspective view that illustrates a vortex generator that is placed in the pipe of an air intake according to one embodiment, FIG. 5 is a diagram that illustrates a turbulent flow created by a vortex generator according to an embodiment of the invention, FIG. 6 is a diagram that illustrates another embodiment of a vortex generator according to the invention, FIG. 7 is a side view of another variant of a vortex generator according to the invention.

DETAILED DESCRIPTION OF THE PREFERRED EMBODIMENTS

Figure 1:
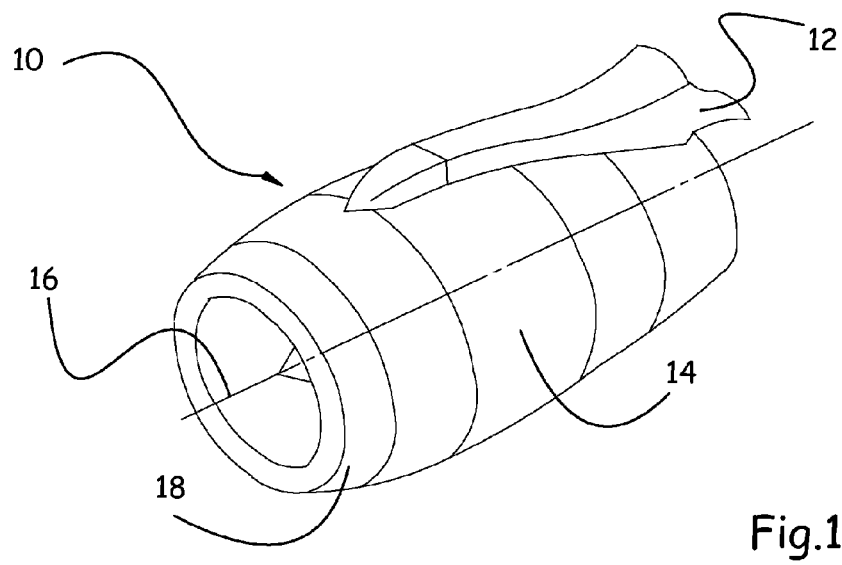
FIG. 1 is a perspective view of an aircraft nacelle.
Figure 2:
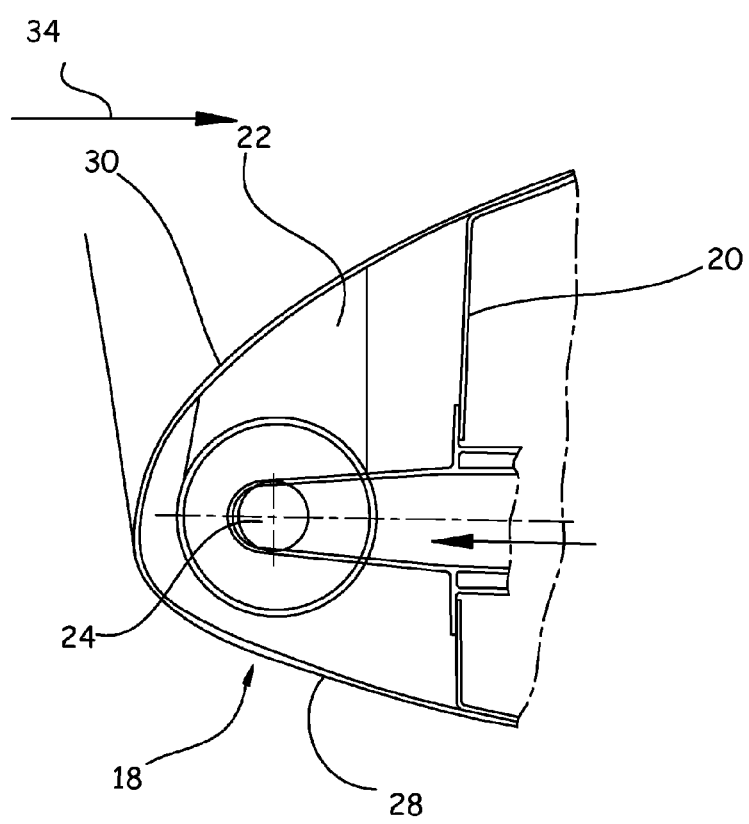
FIG. 2 is a cutaway along a longitudinal plane of the front of a nacelle.
Figure 8:
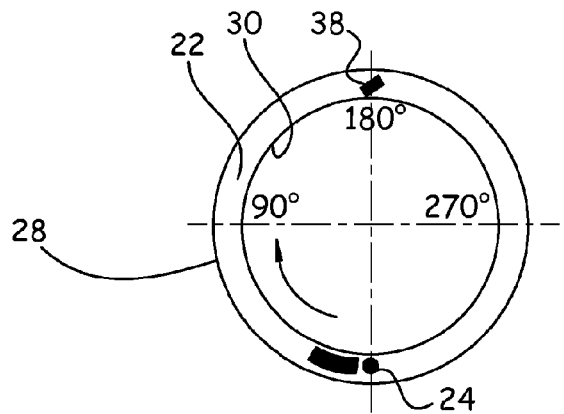
FIG. 8 is a diagram that illustrates an air intake.

FIG. 2 shows an air intake 18 of an aircraft nacelle.

The air intake makes it possible to channel an air flow, referenced by the arrow 34, toward the power plant.

The front part of the air intake 22 describes an essentially circular shape that extends in a plane that can be essentially perpendicular to the longitudinal axis, or not perpendicular, with the front part that is located just before 12 o'clock. However, other forms of air intake can be considered.

The invention relates more particularly to a frost treatment that consists in using the hot air that is drawn off at the power plant.

According to one embodiment, a nacelle comprises a partition that is called a front frame 20 that with the air intake 18 borders a pipe 22 that is called a D-shaped pipe that extends over the entire circumference of the nacelle and that has a D-shaped cross-section.

According to one embodiment, this D-shaped pipe 22 comprises means 24 for localized injection of hot air.

In addition, the D-shaped pipe 22 comprises an exhaust 26 that can be seen in FIG. 3.

According to the illustrated example, the injection means 24 make it possible to generate a flow in the pipe 22 in the clockwise direction (as illustrated in the figures) or in the counterclockwise direction.

A mixer 32 can be arranged inside the pipe 22 just after the means 24 for injection of hot air in the direction of the flow of the hot air flow. This mixer makes it possible to mix the injected hot air with the less hot air that is already present and that circulates in the pipe 22.

The mixer as well as the injection means are not described in more detail because they are known to one skilled in the art, in particular according to the documents FR-2,813,581 and U.S. Pat. No. 6,443,395.

In addition, the invention is not limited to this type of pipe or to this type of hot air supply.

Figure 9:
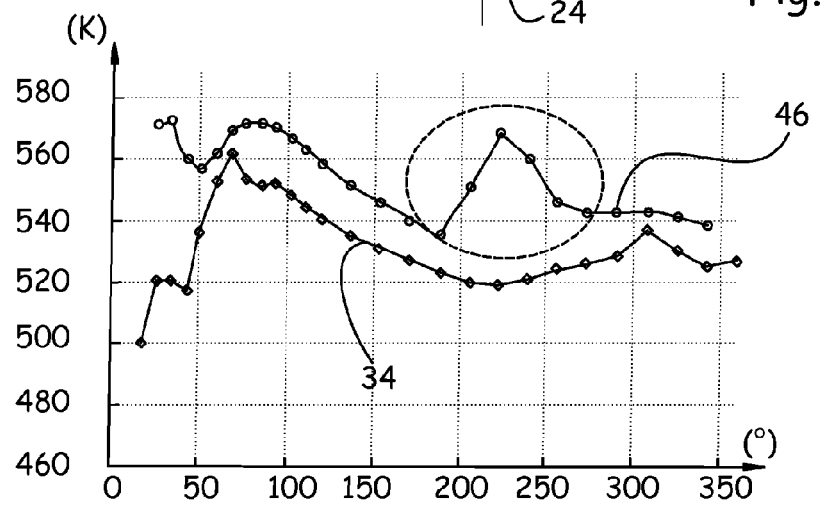
FIG. 9 is a diagram that illustrates the temperature curves over the circumference of the air intake at the inner side with and without a vortex generator.
Figure 10:
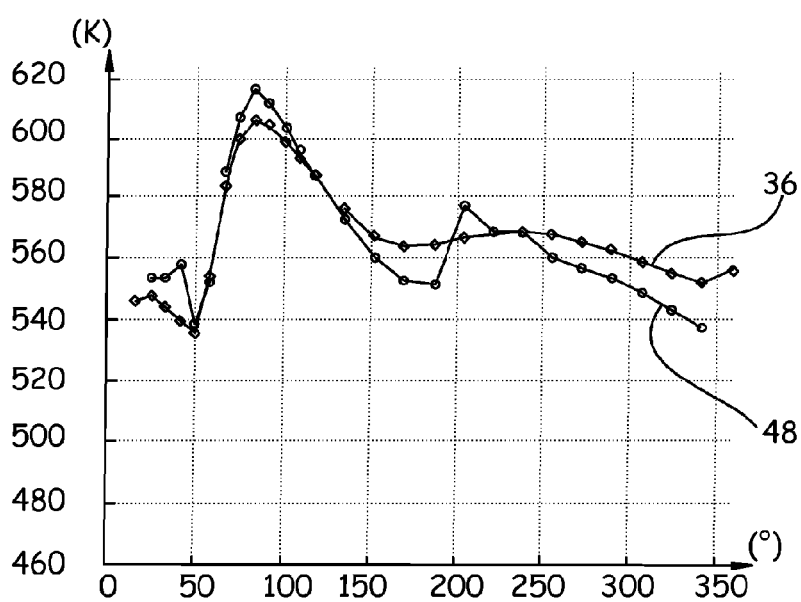
FIG. 10 is a diagram that illustrates the temperature curves over the circumference of the air intake at the outer side with and without a vortex generator.

According to this configuration, there is a tendency to obtain a temperature gradient between the outer side 28 and the inner side 30, as illustrated by the temperature curve 34 in FIG. 9 that corresponds to the temperature at the inner side 30 and the temperature curve 36 in FIG. 10 that corresponds to the temperature at the outer side 28. Thus, at the position that corresponds to 220°, the temperature at the inner side is on the order of 520° K and at the outer side on the order of 570° K, whereas the frost treatment requirements are greater at the inner side than at the outer side.

According to the invention, the air intake comprises at least one vortex generator 38 inside the pipe 22 to disrupt the hot air flow that tends, without a vortex generator, to have temperature gradients between the inner side and the outer side. A vortex generator is a mechanical-type element and comes in the shape of a plate or in a shape projecting from the wall of the pipe (22) making it possible to disrupt the flow of hot air.

Owing to the disruption of the hot air flow, the vortex generator 38 tends to compensate for the action of centrifugal force and to reduce the temperature gradient between the inner side and the outer side.

Preferably, as illustrated in FIGS. 4 and 5, the vortex generator 38 is attached by suitable attachment means to the front frame 20 or to a piece of sheet metal that forms the air intake 18.

As a variant, as illustrated in FIG. 6, the vortex generator 38 cannot be connected but is included in the front frame 20 so as not to vibrate. In this case, the front frame 20 is deformed in such a way as to create a shape that projects into the pipe whose profile is suitable for generating a vortex generator.

According to an embodiment that is illustrated in FIGS. 4 and 5, the vortex generator 38 comprises a plate that is essentially flat, projecting relative to the front frame 20, preferably perpendicular relative to said front frame 20. This plate comprises a first side 40 that is oriented toward the front frame 20 and a second side 42 whose distance that separates it with the first side 40 increases in the direction of flow of the hot air flow in the pipe 22. The plate is arranged in a plane that is neither parallel nor perpendicular with the direction of the hot air flow that flows into the pipe 22.

Advantageously, the plate that forms the vortex generator forms an angle on the order of 20° to 60° relative to the direction of the air flow that flows in the pipe 22.

According to one embodiment, the plate is bordered by three sides, a first rectilinear side 40 that is flattened against the front frame, and a second side 42 in the shape of an arc whose first end that is upstream in the direction of flow is connected to the first side and whose second end that is downstream is connected to a third side 44 that is connected to the first side 40.

As illustrated in FIG. 5, at the rear of the plate, the vortex generator 38 creates a negative pressure that tends to separate the very hot air that is flattened against the outer side 28 toward the center of the pipe 22 and to separate the less hot air that is flattened against the inner side 30 toward the center of the pipe 22.

The fact that the second side 42 is inclined relative to the front frame makes it possible to generate—at the rear of the vortex generator 38—a vortex that promotes the mixing of the air flow inside the pipe, as illustrated in FIG. 5.

According to another embodiment that is illustrated in FIG. 7, the plate that forms the vortex generator is bordered by four sides, a first rectilinear side 40' that is flattened against the front frame, a second side 42' in the shape of an arc of which a first end that is upstream in the direction of flow is connected to the first side 40' and of which the second end that is downstream is connected to a third side 43' that is essentially parallel to the first side 40', and a fourth side 44' that connects the first side 40' to the third side 43' that is essentially perpendicular to the first side 40'.

According to another characteristic of the invention, the plate that constitutes the vortex generator forms an angle with the direction of the hot air flow that circulates inside the pipe such that the upstream end of the first side 40 is closer to the axis of the nacelle than the downstream end of said first side. This configuration makes it possible to obtain a folding of the air flow toward the interior of the nacelle against the action of centrifugal force.

All of these geometric characteristics of the plate can be applied to the projecting shape of the front frame 20 when the vortex generator and the front frame form a single piece. In this case, preferably, the projecting shape comprises a surface that can have geometric shapes that are essentially identical to those of the plate.

FIG. 9 shows a temperature curve 46 at the inner side 30 of the air intake in the presence of a vortex generator 38 that is arranged at approximately 180° from the injection means 24. An increase of the temperature behind the vortex generator 38 relative to the configuration without a vortex generator is noted.

FIG. 10 shows a temperature curve 48 at the outer side 28 of the air intake in the presence of a vortex generator. It is noted that the temperature difference between the outer side and the inner side is greatly reduced behind the vortex generator. Thus, at the position that corresponds to 220°, the temperature at the inner side is on the order of 570° K and at the outer side on the order of 570° K.

Thus, the vortex generator 38 makes it possible to compensate for the action of centrifugal force and to increase significantly the frost treatment capacity at the inner side behind it. Thus, the vortex generator tends to optimize the frost treatment, with the frost treatment capacity being increased without an increase in the injected hot air temperature and/or its flow rate.

Several vortex generators 38 can be arranged along the circumference of the pipe 22.

According to an embodiment, the plate that forms the vortex generator is arranged essentially at the center of the pipe 22.

According to another embodiment, the vortex generator 38 can be connected at at least one point to the front frame or to another part of the air intake in such a way that an air flow can circulate between said vortex generator and the surface of the air intake or the front frame to which it is connected.

According to another aspect of the invention, the vortex generator has a simple and inexpensive design, does not require maintenance, and has a weight that is significantly lower than that of the mixer that is proposed by the documents FR-2,813,581 and U.S. Pat. No. 6,443,395.

The invention claimed is:

1. An air intake of an aircraft nacelle, comprising:
a pipe that extends over the circumference of said air intake and that is bordered to the rear by a front frame (20); and
means (24) for localized injection of hot air in said pipe (22) that provides circulation of hot air in the pipe along a circumference of the nacelle in one direction,
wherein, in the pipe (22), there is provided a vortex generator (38) that disrupts a flow of hot air that flows along the length of the pipe so as to compensate for an action of centrifugal force and reduce a temperature gradient between an inner side and an outer side of said pipe (22),
the vortex generator (38) comprising a surface, said surface having a first side in connection with and running along a surface of the pipe, and a second side defined by a first end connected to an upstream end of the first side and a second end distanced from the surface of the pipe and positioned downstream from the first end.

2. The air intake of an aircraft nacelle according to claim 1, wherein the vortex generator is formed as a projection of the substrate of the front frame (20) that projects from a surface of the front frame (20) into the pipe (22).

3. The air intake of an aircraft nacelle according to claim 1, wherein the surface of the vortex generator (38) is formed on a plate that is essentially flat and that projects relative to the front frame (20) and is attached at the first side to a surface of said front frame (20).

4. The air intake of an aircraft nacelle according to claim 2, wherein the first side of the surface is oriented toward the front frame (20).

5. The air intake of an aircraft nacelle according to claim 2, wherein the vortex generator comprises three sides, the first side (40) being rectilinear, the second side (42) in the shape of an arc with the first end being upstream in a direction of the flow and the second end that is downstream being connected to a third side (44) that is connected to the first side (40).

6. The air intake of an aircraft nacelle according to claim 2, wherein the vortex generator comprises four sides, the first side (40') being rectilinear, the second side (42') in the shape of an arc with the first end being upstream in a direction of the flow and the second end that is downstream being connected to a third side (43') that is essentially parallel to the first side (40'), and a fourth side (44') connecting the first side (40') to the third side (43') that is essentially perpendicular to the first side (40').

7. The air intake of an aircraft nacelle according to claim 2, wherein the vortex generator forms an angle on the order of 20° to 60° relative to the direction of the air flow that flows into the pipe (22).

8. The air intake of an aircraft nacelle according to claim 2, wherein the vortex generator (38) forms an angle with the hot air flow that circulates inside the pipe, the upstream end of the first side that is upstream in the direction of flow of the air flow being closer to an axis of the nacelle than a downstream end of the first side.

9. An aircraft nacelle that integrates an air intake according to claim 1.

10. The air intake of an aircraft nacelle according to claim 3, wherein the first side (40) of the vortex generator is oriented toward the front frame (20), and the second side (42) increases in distance from the first side (40) in a downstream direction of flow of the hot air flow in the pipe (22), the first side (40) being angled relative to the downstream direction such that the upstream end of the first side (40) is closer to an axis of the nacelle than a downstream end of the first side (40).

11. The air intake of an aircraft nacelle according to claim 1, wherein the vortex generator comprises three sides, the first side (40) being rectilinear, the second side (42) in the shape of an arc with the first end being upstream in a direction of the flow and the second end that is positioned downstream being connected to a third side (44) that is connected to the first side (40).

12. The air intake of an aircraft nacelle according to claim 1, wherein the vortex generator comprises four sides, the first side (40') being rectilinear, the second side (42') in the shape of an arc with the first end being upstream in a direction of the flow and the second end that is positioned downstream being connected to a third side (43') that is essentially parallel to the first side (40'), and a fourth side (44') connecting the first side (40') to the third side (43') that is essentially perpendicular to the first side (40').

13. The air intake of an aircraft nacelle according to claim 3, wherein the vortex generator comprises three sides, the first side (40) being rectilinear, the second side (42) in the shape of an arc with the first end being upstream in a direction of the flow and the second end that is positioned downstream being connected to a third side (44) that is connected to the first side (40).

14. The air intake of an aircraft nacelle according to claim 3, wherein the vortex generator comprises four sides, the first side (40') being rectilinear, the second side (42') in the shape of an arc with the first end being upstream in a direction of the flow and the second end that is positioned downstream being connected to a third side (43') that is essentially parallel to the first side (40'), and a fourth side (44') connecting the first side (40') to the third side (43') that is essentially perpendicular to the first side (40').

15. The air intake of an aircraft nacelle according to claim 11, wherein the first side (40) of the vortex generator is oriented toward the front frame (20), the first side (40) being angled relative to the downstream direction such that the upstream end of the first side (40) is closer to an axis of the nacelle than a downstream end of the first side (40).

16. The air intake of an aircraft nacelle according to claim 12, wherein the first side (40') of the vortex generator is oriented toward the front frame (20), the first side (40') being angled relative to the downstream direction such that the upstream end of the first side (40') is closer to an axis of the nacelle than a downstream end of the first side (40').

17. The air intake of an aircraft nacelle according to claim 13, wherein the first side (40) of the vortex generator is oriented toward the front frame (20), the first side (40) being angled relative to the downstream direction such that the upstream end of the first side (40) is closer to an axis of the nacelle than a downstream end of the first side (40).

18. The air intake of an aircraft nacelle according to claim 14, wherein the first side (40') of the vortex generator is oriented toward the front frame (20), the first side (40') being angled relative to the downstream direction such that the upstream end of the first side (40') is closer to an axis of the nacelle than a downstream end of the first side (40').

* * * * *